US011219330B2

(12) United States Patent
Muheim et al.

(10) Patent No.: US 11,219,330 B2
(45) Date of Patent: Jan. 11, 2022

(54) COFFEE MACHINE AND METHOD FOR OPERATING SUCH COFFEE MACHINE

(71) Applicant: RANCILIO GROUP S.P.A., Parabiago (IT)

(72) Inventors: Christian Muheim, Dottikon (CH); Pascal Beck, Dottikon (CH); Babeesan Poopalasingam, Dottikon (CH)

(73) Assignee: Rancilio Group S.p.A., Parabiago (IT)

( * ) Notice: Subject to any disclaimer, the term of this patent is extended or adjusted under 35 U.S.C. 154(b) by 0 days.

(21) Appl. No.: 17/295,504

(22) PCT Filed: Nov. 22, 2019

(86) PCT No.: PCT/IB2019/060070
§ 371 (c)(1),
(2) Date: May 20, 2021

(87) PCT Pub. No.: WO2020/105007
PCT Pub. Date: May 28, 2020

(65) Prior Publication Data
US 2021/0353093 A1 Nov. 18, 2021

(30) Foreign Application Priority Data
Nov. 23, 2018 (IT) .................. 102018000010535

(51) Int. Cl.
*A47J 31/42* (2006.01)
*A47J 31/52* (2006.01)
*A47J 31/40* (2006.01)

(52) U.S. Cl.
CPC .............. *A47J 31/42* (2013.01); *A47J 31/52* (2013.01); *A47J 31/40* (2013.01)

(58) Field of Classification Search
CPC .................................. A47J 31/42; A47J 31/44
(Continued)

(56) References Cited

U.S. PATENT DOCUMENTS

| 6,101,923 A | 8/2000 | Karg et al. |
| 2010/0224075 A1 | 9/2010 | Anliker |

(Continued)

FOREIGN PATENT DOCUMENTS

| DE | 202008001749 U1 | 4/2008 | |
| DE | 202011005003 U1 | 8/2011 | |
| WO | WO-2016029355 A1 * | 3/2016 | ............... A47J 31/42 |

OTHER PUBLICATIONS

International Search Report and Written Opinion of the International Searching Authority issued for International PCT Application No. PCT/IB2019/060070 dated Feb. 25, 2020.

*Primary Examiner* — Reginald Alexander
(74) *Attorney, Agent, or Firm* — Howson & Howson LLP

(57) ABSTRACT

A coffee machine, preferably a fully automatic coffee machine, as well as a method for operating such coffee machine are provided. The coffee machine includes a coffee bean supplying unit comprising a plurality of coffee bean containers, a grinding unit comprising a single grinder, a selecting unit for selectively connecting one of the coffee bean containers to the grinder, a brewing unit comprising a single brewing chamber, and a dispensing unit. Thanks to the provision of a single grinder and of a single brewing chamber, the coffee machine has an extremely compact construction, while being capable of preparing a variety of different coffee-based drinks thanks to the provision of a plurality of coffee bean containers.

9 Claims, 2 Drawing Sheets

(58) Field of Classification Search
USPC .......................................................... 99/286
See application file for complete search history.

(56) References Cited

U.S. PATENT DOCUMENTS

| | | |
|---|---|---|
| 2014/0014680 A1 | 1/2014 | van Os et al. |
| 2015/0135966 A1* | 5/2015 | Hulett ................ G05D 23/1951 99/289 R |
| 2017/0099980 A1 | 4/2017 | Haidar et al. |
| 2018/0008088 A1* | 1/2018 | Alshammary ............ A23F 5/08 |

* cited by examiner

COFFEE MACHINE AND METHOD FOR OPERATING SUCH COFFEE MACHINE

TECHNICAL FIELD

The present invention relates to a coffee machine, preferably a fully automatic coffee machine.

More particularly, the present invention relates to a fully automatic coffee machine which is adapted to prepare several kinds of different coffee-based drinks.

The present invention also relates to a method for operating such coffee machine.

BACKGROUND ART

Fully automatic coffee machines, also called "coffee automats" are known and widespread, especially in the restaurant industry.

Such coffee machines work in a fully automatic way, i.e. it is sufficient that the user presses a button on an interface of the coffee machine for starting and carrying out the whole process of preparation of a coffee-based drink. This process essentially comprises the following steps: grinding the exact amount of coffee beans; accumulating the ground coffee powder in a suitable chamber; compacting and compressing the coffee powder until forming a "cake"; sending a dosed water flow at a predetermined temperature and pressure through said "cake"; collecting the coffee infusion and sending it downstream towards an outlet spout; dispensing the coffee infusion through said spout into a cup, or similar container.

Other ingredients, such as cocoa powder, milk, frothed milk, flavoring agents, and the like, may optionally be added to the coffee infusion, either in the coffee machine or directly in said cup or container, for obtaining the desired coffee-based drink.

Fully automatic coffee machines are known, in which the properties of the dispensed drink can be modified and adjusted by intervening on one or more operating parameters of the coffee machine.

For instance, the coarseness and the amount of the ground coffee powder can be modified by adjusting the grinding time and/or the position of the grinding burrs.

In addition or in alternative, the properties of the dispensed drink can be modified by adjusting the brewing temperature and/or the brewing pressure in the brewing chamber.

In order to increase the versatility of these machines, fully automatic coffee machines that are adapted to dispense different kinds of coffee-based drinks have also been developed.

Such coffee machines are capable, for instance, of dispensing both espresso coffee (the preparation of which requires a high brewing pressure) and American coffee (the preparation of which requires a low brewing pressure for avoiding formation of "crema"). Furthermore, such coffee machines are capable, for instance, of dispensing coffee-based drinks starting from different coffee blends.

U.S. Pat. No. 6,101,923 discloses a fully automatic coffee machine in which coffee beans are received in a container having a partition wall defining two separate compartments, which allows two different blends of coffee to be used. In order to prepare a coffee-based drink starting from the desired coffee blend, each compartment of this container is connected through its own funnel to a separate, dedicated grinder. The freshly ground powder thus obtained can successively be supplied to a first or to a second brewing chamber for the preparation of the desired coffee-based drink.

US 2010/0224075 discloses a fully automatic coffee machine comprising at least two brewing groups for producing a coffee beverage, which groups are independent from each other and can be separately controlled, a device for the preparation and distribution of the coffee powder to the brewing groups, as well as a common coffee dispensing outlet. Each brewing group has a different geometry, as it has been found that the quality of a specific coffee-based drink can be improved by an appropriate brewing group geometry. The coffee machine further comprises several storage containers which hold different sorts of coffee beans, so that, thanks to the possibility of selecting the sort of coffee beans and the brewing group, a large variety of coffee-based drinks can be produced.

Although allowing to effectively obtain several kinds of different coffee-based drinks, the above-described coffee machines are not free from drawbacks.

These machines are generally bulky objects, which take a large amount of space and are often incompatible with modern and attractively designed restaurants.

Moreover, these machines include a high number of mechanical components, which involve a large amount of maintenance. The need for maintenance is also increased by the fact that, during use, such mechanical components are contaminated with coffee powder and exposed to water and coffee infusions.

The main object of the present invention is therefore to provide a coffee machine, preferably a fully automatic coffee machine, which is capable of dispensing different kinds of coffee-based drinks and, at the same time, has a compact construction.

Another object of the present invention is to provide a coffee machine, preferably a fully automatic coffee machine, having a limited number of mechanical components, so that the frequency of maintenance can be accordingly reduced.

These and other objects are achieved by a coffee machine as claimed in the appended claims.

SUMMARY OF INVENTION

According to the invention, the coffee machine comprises several coffee bean containers for receiving different blends of coffee, a single grinder for selectively grinding the coffee beans coming from one of said containers, and a single brewing chamber for receiving the coffee powder coming from said grinder and preparing the desired coffee-based drink.

Thanks to the provision of a single grinder and a single brewing chamber, the coffee machine according to the invention has an extremely compact construction.

The coffee machine according to the invention further comprises an interface through which the user can select a desired coffee-base drink among a plurality of different coffee-based drinks.

The coffee machine according to the invention further comprises a control unit that is arranged to control one or more operating parameters of the coffee machine according to the selection inputted by the user.

The coffee machine according to the invention further comprises a memory unit, in which the recipes of the available coffee-based drinks are stored.

In this context, "recipe" means not only the list of ingredients and preparation steps of each coffee-based drink, but also the list of values or ranges of values of the operating parameters of the coffee machine (with particular reference to the selecting unit, the grinding unit and the brewing unit of said coffee machine) that are to be set in order to correctly carry out the preparation process of said drink.

According to a preferred embodiment of the invention, the control unit is arranged to control one or more of the following parameters:
- position of a selecting element, allowing to selectively connect a specific coffee bean container to the single grinder;
- position of the grinding elements of the grinder;
- grinding time;
- temperature of the water entering the brewing chamber;
- pressure of the water entering the brewing chamber;
- flow rate of the water entering the brewing chamber;
- brewing time.

It will be evident to the person skilled in the art that the coffee machine according to the invention could optionally comprise one or more additional units, such as, for instance, a milk supplying unit for producing frothed milk to be added to the coffee-based drink, a cooling unit for cooling down the coffee-based drink to be dispensed, and so on.

The invention further relates to a method for operating a coffee machine comprising several coffee bean containers for receiving different blends of coffee, a single grinder for selectively grinding the coffee beans coming from one of said containers, and a single brewing chamber for receiving the coffee powder coming from said grinder and preparing the desired coffee-based drinks.

The method according to the invention essentially comprises the steps of:
- selecting a coffee-based drink;
- selecting the corresponding coffee bean container according to the selected drink and connecting it to the single grinder;
- transferring a dose of coffee beans from said coffee bean container to the grinder;
- adjusting the operating parameters of the grinder, such as the position of the grinding burrs and the grinding time, according to the selected drink;
- grinding the coffee beans for obtaining the desired dose of coffee powder;
- transferring said dose of coffee powder to the brewing chamber;
- adjusting the operating parameters of the brewing chamber, such as the density of the coffee "cake", the pressure and temperature of the incoming water and the brewing time, according to the selected drink;
- compacting and compressing said dose of coffee powder for obtaining a coffee "cake";
- sending a water flow through said coffee "cake";
- collecting the obtained coffee-based drink and dispensing it to the user.

Preferably, the method according to the invention further comprises the step of acquiring the recipe of the selected coffee-based drink and carrying out the successive steps according to the details of said recipe.

In order to correctly prepare coffee-based drinks having different recipes, the coffee machine according to the invention and the method for operating such coffee machine provide for arrangements and solutions allowing to avoid (or at least minimize) contamination between coffee-based drinks that are successively prepared.

By way of example, the connections between the different coffee bean containers and the single grinder are designed so as to effectively avoid mixing of coffee beans coming from different containers.

By way of further example, the grinding time of which the grinder is actuated is set so as to guarantee that no leftovers remain in the grinder at the end of the grinding step.

BRIEF DESCRIPTION OF DRAWINGS

Further features and advantages will be more evident from the detailed description of a preferred embodiment of the invention, given by way of non-limiting example, with reference to the accompanying drawings, in which.

DESCRIPTION OF EMBODIMENTS

Figure 1:
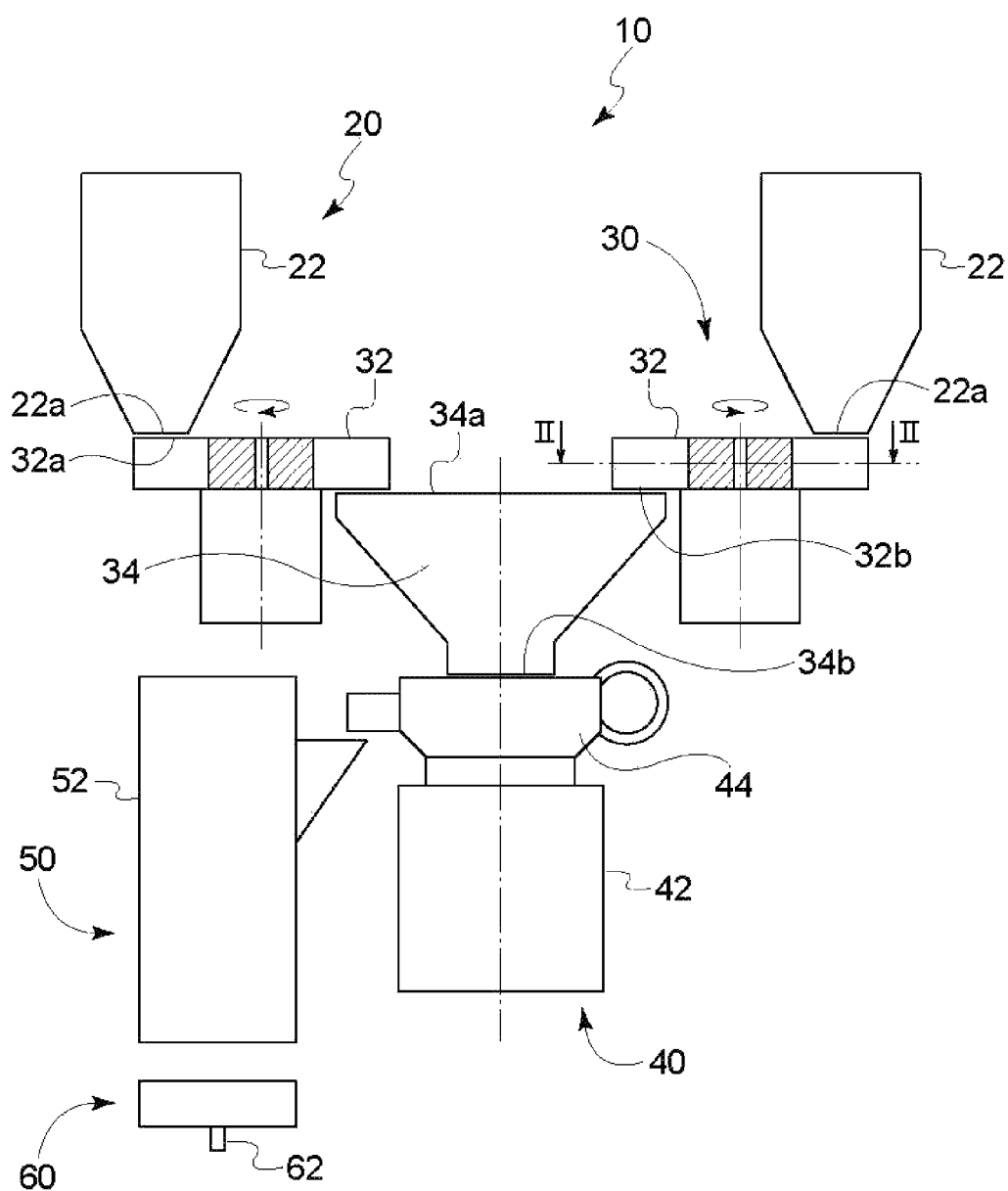
FIG. 1 schematically shows the construction of the coffee machine according to the preferred embodiment of the invention.

With reference to FIG. 1, a coffee machine 10 according to the invention is schematically shown.

Preferably, the coffee machine 10 is a fully automatic coffee machine ("coffee automat"), i.e. a coffee machine in which the production of a coffee-based drink is started and carried out by simply selecting a desired drink from a menu (for instance by pressing a button).

The coffee machine 10 is designed so as to be capable of producing different coffee-based drinks starting from different coffee blends (e.g. Arabica blend, Robusta blend, decaffeinated blend, and so on).

To this purpose, the coffee machine 10 comprises a coffee bean supplying unit 20 including a plurality of separate coffee bean containers 22.

In FIG. 1, two coffee bean containers 22 can be seen. It is evident that any desired number of different coffee bean containers can be envisaged. Four coffee bean containers could be considered as a good compromise between the possibility of preparing coffee-based drinks from different coffee blends and the advantage of providing a coffee machine with a compact construction.

Each coffee bean container 22 may contain a different blend of coffee beans.

According to the invention, the coffee machine 10 comprises a grinding unit 40 including a single grinder 42.

Accordingly, the coffee machine 10 comprises a selecting unit 30 that is arranged between the coffee bean containers 22 of the coffee bean supplying unit 20 and the grinder 42 of the grinding unit 40.

In general, the selecting unit 30 is designed so as to selectively connect only one of the coffee bean containers 22 to the grinder 42.

In the shown embodiment, the selecting unit 30 comprises a rotary feeder 32 for each coffee bean container 22 and a common funnel 34.

Each rotary feeder 32 is arranged with its inlet 32a under the outlet 22a of a respective coffee bean container.

The common funnel 34 is sized and arranged so that its inlet 34a is arranged under the outlets 32b of all the rotary feeders 32 and its outlet 34b is over the inlet of the grinding unit 40.

Figure 2:
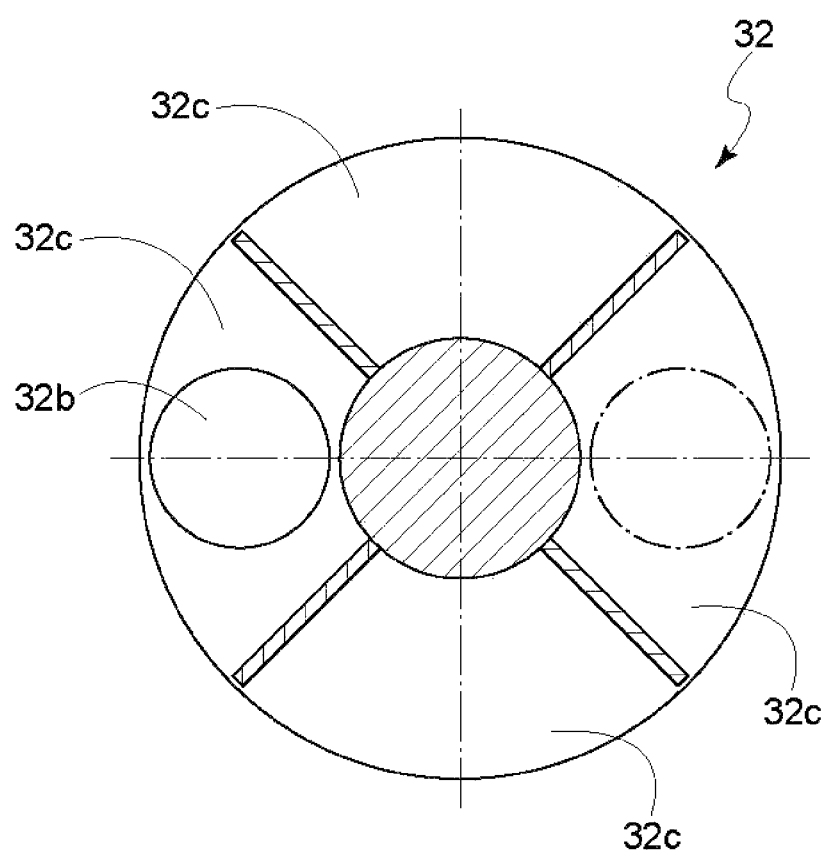
FIG. 2 is a cross-sectional view of a rotary feeder of the selecting unit of the coffee machine of FIG. 1.

With reference also to FIG. 2, each rotary feeder 32 has a solid body, in which one or more dosing compartments 32c are provided.

By rotating the rotary feeder about its axis, a dosing compartment 32c can be brought into alignment with the inlet 32a of the rotary feeder 32 or the outlet 32b of said rotary feeder 32 or neither of them.

If the dosing compartment 32c is brought into alignment with the inlet 32a of the rotary feeder 32 (which is arranged under the outlet 22a of the respective coffee bean container 22), a dose of coffee beans can fall from the coffee bean container 22 into the dosing compartment 32c. As long as the dosing compartment 32c is not in alignment with the outlet 32b of the rotary feeder, said dose of coffee beans cannot be transferred to the grinding unit. When the dosing compartment 32c is brought into alignment with the outlet 32b of the rotary feeder 32 (which is arranged over the inlet 34a of the common funnel 34), said dose of coffee beans can fall from the rotary feeder 32 into the funnel 34.

Therefore, by adequately controlling the rotation of the different rotary feeders 32, the coffee beans coming from the desired container 22 can be selected and transferred to the grinding unit 40.

It is evident that the selecting unit 30 can be designed according to many alternative arrangements other than the arrangement shown in FIG. 1.

For instance, according to an alternative embodiment of the invention, the selecting unit 30 could comprise a sliding feeder comprising one or more dosing compartments, which can be translated along one or more directions and selectively brought into alignment with the outlets of the different coffee bean containers and with the inlet of a common funnel.

According to another alternative embodiment of the invention, the selecting unit 30 could comprise one or more screw conveyors configured to carry a dose of coffee beans from the outlets of the different coffee bean containers to a common funnel.

According to a further alternative embodiment of the invention, the outlets 22a of the different coffee bean containers could be directly arranged over the inlet of a common funnel and the selecting unit 30 could comprise a movable shutter arranged at the outlet of each container, said shutters being controllable so as to selectively open/close the outlets of the coffee bean containers 22, so as to let a dose of the selected coffee beans fall into the underlying funnel.

As mentioned above, the grinding unit 40 comprises a single grinder 42, which allows to design the coffee machine 10 according to the invention with a very compact construction.

Preferably, the grinding unit 40 further comprises an adjusting device 44, through which the geometry of the grinding elements (burrs) of the grinder 42 can be adjusted.

For instance, the adjusting device 44 is capable of moving the grinding burrs of the grinder 42 relative to each other for adjusting the distance between said grinding burrs.

Such an adjusting device is disclosed, for instance, in U.S. Pat. No. 6,149,084 in the name of the Applicant and, therefore, it will not be described in detail herein.

The grinder 42 grinds the selected dose of coffee beans coming from the funnel 34 of the selecting unit 30, thus allowing to obtain the correct dose of coffee powder.

This dose of freshly ground coffee powder is transferred from the grinding unit 40 to the brewing unit 50.

According to the invention, this brewing unit 50 comprises a single brewing chamber 52, which further enhances the compactness of the construction of the coffee machine 10.

In a per se known manner, the dose of coffee powder is compacted and compressed in the brewing chamber by means of pistons working at a predetermined tamping pressure so as to obtain a coffee "cake" and a flow of water at predetermined temperature and pressure is passed through the coffee "cake", thus obtaining a coffee infusion.

Such coffee infusion is transferred through a piping to a dispensing unit 60.

The dispensing unit 60 comprises an outlet spout 62, through which the coffee-based drink can be delivered into a cup.

One or more additional functional units can be provided in the coffee machine 10, e.g. for adding additional ingredients to the coffee-based drink.

For instance, a cooling unit (not shown) can be connected to the piping between the brewing unit 50 and the dispensing unit 60 for admixing cold water to the coffee infusion.

For instance, a milk supplying unit (not shown) arranged to produce frothed milk and add said frothed milk to the coffee infusion could be provided in the coffee machine and arranged for providing frothed milk at the dispensing unit 60, for instance by means of an additional spout. Analogously, a cocoa powder supplying unit (not shown) could be provided in the coffee machine and arranged for adding cocoa powder to the drink at the dispensing unit 60, for instance by means of a further additional spout.

Preferably, the coffee machine 10 according to the invention further comprises a user interface (not shown), through which the user can select the desired coffee-based drink, for instance by pressing a button or by acting onto a touch screen.

In a per se known manner, such interface could include a display showing the available coffee-based drinks as well as additional information (such as, for instance, the prices of such drinks, the progress of a drink that is being prepared, and so on).

The coffee machine 10 further comprises a control unit (not shown) arranged to control the operation of the selecting unit 30, of the grinding unit 40 and/or of the brewing unit 50 (as well as of other functional units, if any) depending on the drink selected by the user through the above-mentioned interface or through another inputting device.

It is to be noted, in this respect, that—in addition or as an alternative to the interface provided in the coffee machine 10—it is possible to envisage that the user can select his/her drink through a separate device, even a remote device, such as a computer, a cell phone or the like.

The control unit of the coffee machine is arranged to control one or more of the following parameters:
 position of the rotary feeders 32 of the selecting unit 22;
 position of the grinding elements of the grinder 42;
 grinding time;
 tamping pressure of the pistons in the brewing chamber 52;
 temperature of the water entering the brewing chamber 52;
 pressure of the water entering the brewing chamber 52;
 flow rate of the water entering the brewing chamber 52;
 brewing time.

The control unit of the coffee machine is further connected to a memory in which the recipes of the available coffee-based drinks are stored, so that this control unit can control the above-mentioned parameters according to the details of the recipe of the selected drink.

Said memory can be either a memory unit installed in the coffee machine 10 and connected to the control unit or an external memory arranged elsewhere, even in a remote location, and in communication with the control unit.

The invention further relates to a method for operating a coffee machine including a coffee bean supplying unit comprising several coffee bean containers, a selecting unit, a grinding unit comprising a single grinder, a brewing unit comprising a single brewing chamber, and a dispensing unit.

The method according to the invention essentially comprises the steps of:
- selecting a coffee-based drink;
- selecting a coffee bean container of the coffee bean supplying unit depending on the selected drink;
- connecting, through the selecting unit, the selected coffee bean container to the grinder of the grinding unit and transferring a dose of coffee beans from the selected coffee bean container to the grinder;
- adjusting the operating parameters of the grinder depending on the selected drink;
- grinding the coffee beans coming from the selected coffee bean container and transferring the dose of coffee powder thus obtained to the brewing chamber of the brewing unit;
- adjusting the operating parameters of the brewing chamber depending on the selected drink;
- compacting and compressing said dose of coffee powder for obtaining a coffee "cake";
- sending a water flow through said "cake";
- collecting the obtained coffee-based drink and dispensing it through the dispensing unit.

The step of selecting a coffee-based drink can comprise the step of acquiring a selection made by a user through an interface of the coffee machine.

In order to carry out the following steps, the method according to the invention can comprise—after the step of selecting a coffee-based drink—a step of acquiring the recipe of the selected drink from a memory.

Preferably, the operating parameters of the grinder of the grinding unit and/or of the brewing chamber of the brewing unit are set so as avoid contamination between different coffee-based drinks that are successively prepared.

In this respect, the grinding time of the grinder of the grinding unit is set long enough to guarantee that no leftovers remain in the grinder (between the grinding elements) at the end of the grinding step.

It will be evident to the person skilled in the art that the above description of a preferred embodiment of the invention has been given merely by way of example and that several variants and modifications within the reach of the person skilled in the art can be envisaged, without departing from the scope of protection of the appended claims.

For instance, in case a large number of different coffee bean blends is to be handled, it is possible to envisage a coffee machine comprising a plurality of separate coffee bean containers and a plurality of grinding units, each comprising a single grinder connected to at least two of said plurality of separate coffee bean containers, and further comprising one or more brewing units, each comprising a single brewing chamber connected to one or more of said grinders of said grinding units.

Moreover, in the above description of the preferred embodiments reference is made to an automatic coffee machine, in which the ground coffee powder is compacted and compressed in the brewing unit for obtaining a "cake" and then a dosed water flow at a predetermined temperature and pressure is passed through said "cake". However, the invention could also be applied to other kind of coffee machines, such as a machine for producing filter coffee, in which the coffee powder is not pressed and the water flows through the powder at a pressure close to the atmospheric pressure.

The invention claimed is:

1. A coffee machine, comprising a coffee bean supplying unit, a grinding unit, a brewing unit and a dispensing unit, characterized in that said wherein the coffee bean supplying unit comprises a plurality of separate coffee bean containers, the grinding unit comprises a single grinder connected to at least two coffee been containers of the plurality of separate coffee bean containers, and the brewing unit comprises a single brewing chamber connected to the grinder, wherein the coffee machine comprises a selecting unit, which is arranged between the coffee bean supplying unit and the grinding unit and selectively connects one coffee bean container of the plurality of separate coffee bean containers to the grinder, wherein the selecting unit comprises a plurality of rotary feeders, one for each of the coffee bean containers of the plurality of separate coffee bean containers, and a common funnel, an inlet of each of the rotary feeders being arranged under an outlet of a respective one of the coffee bean containers of the plurality of separate coffee bean containers, an outlet of each of the rotary feeders being arranged over an inlet of the common funnel, an outlet of the common funnel being in communication with the grinding unit, and each of the rotary feeders being provided with one or more dosing compartments that can be brought into alignment with the inlet of the rotary feeder or with the outlet of the rotary feeder (32) or with neither of them.

2. The coffee machine according to claim 1, wherein the grinding unit comprises a single grinder provided with grinding elements, and wherein the grinding unit comprises an adjusting device arranged to adjust the a configuration of the grinding elements of the grinder.

3. The coffee machine according to claim 1, wherein the coffee machine further comprises a user interface, through which a coffee-based drink is selectable by a user.

4. The coffee machine according to claim 1, wherein the coffee machine further comprises a control unit arranged to control operation of the selecting unit, of the grinding unit and/or of the brewing unit depending on the selected coffee-based drink.

5. The coffee machine according to claim 1, wherein the coffee machine further comprises a memory unit in which the recipes of the coffee-based drinks are stored.

6. A method for operating a coffee machine including a coffee bean supplying unit comprising a plurality of coffee bean containers, a selecting unit, a grinding unit comprising a single grinder, a brewing unit comprising a single brewing chamber, and a dispensing unit, wherein the method comprises:
- selecting a coffee-based drink among a plurality of coffee-based drinks;
- selecting a coffee bean container of the coffee bean supplying unit depending on the selected drink;
- connecting, through the selecting unit, the selected coffee bean container to the grinder of the grinding unit and transferring a dose of coffee beans from the selected coffee bean container to the grinder;
- adjusting the operating parameters of the grinder depending on the selected drink;
- grinding the dose of coffee beans and transferring the obtained dose of coffee powder to the brewing chamber of the brewing unit;
- adjusting the operating parameters of the brewing chamber depending on the selected drink;
- brewing the coffee-based drink by sending a water flow through said the coffee powder; and
- dispensing the coffee-based drink through the dispensing unit;
- wherein the selecting unit comprises a plurality of rotary feeders, one for each of the coffee bean containers of the plurality of coffee bean containers, and a common funnel, the inlet of each rotary feeder being arranged under the outlet of a respective coffee bean container of the plurality of coffee bean containers, the outlet of each rotary feeder being arranged over the inlet of the funnel, the outlet of the funnel being in communication with the grinding unit, and each rotary feeder being provided with one or more dosing compartments that can be brought into alignment with the inlet of the rotary feeder or with the outlet of the rotary feeder or with neither of them;

and wherein the method further comprises:

bringing one of the dosing compartments into alignment with the inlet of the rotary feeder for letting a dose of coffee beans fall from the coffee bean container into the dosing compartment and bringing the one of the dosing compartments into alignment with the outlet of the rotary feeder for letting the dose of coffee beans fall from the rotary feeder into the funnel.

7. The method according to claim 6, wherein of brewing the coffee-based drink comprises:

compacting and compressing the dose of coffee powder for obtaining a coffee "cake";

sending a water flow through the coffee "cake".

8. The method according to claim 6, wherein selecting a coffee-based drink comprises acquiring a selection made by a user through an interface of the coffee machine.

9. The method according to 6, wherein the method comprises acquiring the recipe of the selected coffee-based drink from a memory unit of the coffee machine.

* * * * *